(12) United States Patent
Samaroo (10) Patent No.: US 8,166,992 B2
(45) Date of Patent: May 1, 2012

(54) PLACEMENT OF FLUIDS IN GROUND BY PULSE-INJECTION

(75) Inventor: Mahendra Samaroo, Edmonton (CA)

(73) Assignee: Wavefront Reservoir Technologies Ltd., Cambridge, Ontario (CA)

( * ) Notice: Subject to any disclaimer, the term of this patent is extended or adjusted under 35 U.S.C. 154(b) by 522 days.

(21) Appl. No.: 12/441,942

(22) PCT Filed: Sep. 25, 2007

(86) PCT No.: PCT/CA2007/001709
§ 371 (c)(1),
(2), (4) Date: Mar. 19, 2009

(87) PCT Pub. No.: WO2008/037069
PCT Pub. Date: Apr. 3, 2008

(65) Prior Publication Data
US 2010/0065124 A1 Mar. 18, 2010

(30) Foreign Application Priority Data
Sep. 25, 2006 (GB) .................................. 0618837.9

(51) Int. Cl.
*E03B 5/00* (2006.01)

(52) U.S. Cl. ... 137/1; 137/565.01; 137/269; 137/624.13

(58) Field of Classification Search .................. 137/269, 137/565.01, 624.13, 1
See application file for complete search history.

(56) References Cited

U.S. PATENT DOCUMENTS

| 436,004 | A | 11/1982 | Cove et al. |
| 495,359 | A | 8/1990 | Kotlyar |
| 5,231,948 | A | 8/1993 | Malmanger et al. |
| 5,377,396 | A | 1/1995 | Moran, Jr. |
| 5,975,053 | A * | 11/1999 | Rodier ..................... 251/129.18 |
| 6,241,019 | B1 | 6/2001 | Davidson |
| 6,334,277 | B1 | 1/2002 | Condino |

(Continued)

FOREIGN PATENT DOCUMENTS

JP 2001129529 5/2001

(Continued)

OTHER PUBLICATIONS

Field Applications of Pressure Pulsing in Porous Media, 2001.

(Continued)

*Primary Examiner* — Kevin Lee
(74) *Attorney, Agent, or Firm* — Anthony Asquith Corp.

(57) ABSTRACT

For use when injecting remediation liquid via an injection-well into contaminated groundwater, in the ground. The injection equipment includes a pulse-generator, which has an upstream chamber and a downstream chamber, linked by a pulse-conduit and a bypass conduit. The pulse-conduit includes a pulse-port, which opens and closes cyclically. The pulse-port is formed by the interaction of two apertures, one in the motorised rotor, the other in the stator. The rotor and stator may be formed as two facing plates held slightly apart, or as two cylinders one inside the other. The pulse-generator is located at the ground surface and can be adjusted as to pulse frequency, pulse amplitude, pulse rise-time, and as the the differential pressure between the upstream-chamber and the downstream chamber.

18 Claims, 3 Drawing Sheets

U.S. PATENT DOCUMENTS

| | | |
|---|---|---|
| 6,405,797 B2 | 6/2002 | Davidson et al. |
| 6,851,473 B2 | 2/2005 | Davidson |
| 6,883,543 B2 * | 4/2005 | Tew et al. ................ 137/624.13 |
| 702,513 A1 | 4/2006 | Byrd et al. |
| 7,025,134 B2 | 4/2006 | Byrd et al. |
| 7,114,560 B2 | 10/2006 | Nguyen et al. |
| 7,417,920 B2 * | 8/2008 | Hahn et al. ...................... 367/85 |
| 2002/0178560 A1 | 12/2002 | Cardona |
| 2006/0102340 A1 | 5/2006 | Virally et al. |
| 2006/0272821 A1 | 12/2006 | Webb et al. |

FOREIGN PATENT DOCUMENTS

WO    WO/2004113672    12/2004

OTHER PUBLICATIONS

Completing Biot Theory, 2003.
Porosity-Pressure Propagation, 2002.
Fundamental Thermodynamic Requirements for Porous Media Description, 2003.

* cited by examiner

PLACEMENT OF FLUIDS IN GROUND BY PULSE-INJECTION

The injection systems described herein are used for injecting fluids, especially liquids, into the ground, in applications where the injection apparatus is located at the ground surface, and the injected fluid is conveyed down into the ground through a pipe or conduit at the injection-well.

Groundwater that has been contaminated with a toxic liquid can often be cleaned up by injecting an antidote fluid into the ground Often, the toxic liquid is present as a plume travelling through the ground with the groundwater. When cleaning up a body of contaminated groundwater, it is customary to conduct an accurate survey of the site, and to plot the lateral extents of the contamination plume, and the depth at which it occurs. To do this, sampling-wells are drilled (or otherwise made) down into the ground. The sampling-wells are usually pitched on a grid, to determine the lateral extent of the plume. These sampling-wells often can serve, in due course, as injection-wells.

Determinations are made as to the nature of the contaminant; also as to the extent and depth of the plume, permeability of the ground, in-ground water-pressure and temperature, presence of liquids other than the groundwater and the contaminant, and so forth. Based on these, a remediation liquid is chosen, and determinations are made as to pressures at which the remediation liquid must be injected, volumetric flowrates, and so forth.

One of the factors to be considered is the furthest extent to which the remediation liquid can be expected to penetrate laterally, away from the injection point. It is well known that if a liquid is injected under a static pressure, the liquid tends to spread out laterally in fingers, as it follows the paths of least resistance through the ground material. These paths then tend to open out, and the spaces between the paths tend to close up, as injection progresses. Thus, even though a large volume is being injected, and traces of the injected liquid might be present along a first radius at a distance of e.g thirty metres from the injection well, on another radius from the same well, the injected liquid might not be detectable at three metres.

It is known that applying pulses to the remediation liquid, as it is being injected, can assist in filling-in the gaps between the preferred pathways, whereby the injected liquid tends to advance outwards on a much more nearly circular front than is the case when a steady pressure is used for the injection. In short: pulsing reduces fingering. Pulsing also assists in mixing the injected liquid more thoroughly with the contaminated liquid, and pulsing can even also assist in homogenising the ground; that is to say, the physical structure of the ground is changed (slightly) such that the permeability of the ground around the injection site becomes more uniform over the area of injection.

Sometimes, the remediation is being carried out in respect of a liquid that has already been injected into and from the injection well, especially when the injected liquid is thicker (more viscous) than the water or other liquid already present in the aquifer. Now, the viscous liquid might resist attempts to disperse it by injecting a thinner remediation liquid, in that the remediation liquid would then tend very much to finger its way through. Pulsing the thinner liquid while injecting it can have beneficial effects in dispersing the viscous liquid in such cases.

The shape or profile of the pulses that are applied to the injected liquid is important. A pulse profile naturally contains an increase in injection pressure, followed by a decrease. If the injection is done in such a way that the profile of the pressure changes relatively slowly, it is likely that the injected liquid will not travel so far, laterally, away from the injection well. On the other hand, if the rise-time is done rapidly—that is to say, if the pulse profile includes an initial "explosion" of pressure—the further the pulse, and the injected liquid, can be expected to travel laterally away from the injection well.

The more explosive the start of the pulse, the more the pulse is likely to include a porosity wave travelling through the ground. A porosity wave has very good penetrating power, and it can reduce the permeability of the ground, at least momentarily, whereby the remediation liquid can then penetrate volumetrically through the ground, and quickly through the contaminated groundwater therein.

Again, it is desirable for the pulse to be as "explosive" as possible (i.e for the pressure-pulse rise-time to be as short as possible)—while noting that the maximum acceptable pressure that can be applied to the ground should not be exceeded, even momentarily.

What these considerations mean is that the injection apparatus needs to be adjustable. The injections-engineer wishes to be able, easily, to change such parameters as the pulse-frequency, pulse-amplitude, pulse-rise-time, etc. These parameters are inevitably interlinked, whereby adjusting one affects another, but still the engineer wishes them to be adjustable as independently of each other as possible. The engineer wishes to be able not only to zero-in quickly on the optimal parameters to use initially, but to keep changing the adjustment of the parameters, from the standpoint of continuing optimisation, as injection progresses.

The changing conditions should be monitored as injection progresses. Monitoring should include constant attention to pressures and flowrates, and might include taking samples from nearby wells—typically the sampling wells already made during the initial survey. Often, injection of a remediation liquid is done through wells pitched on a suitably-pitched grid over the contaminated site, and these sampling wells can also serve as injection wells.

Although many aspects of the injection procedures can be pre-calculated as to their optimum values, for the particular injection-site, accurate calculations as to just what pulse-profiles might be desirable, or achievable. in the particular case, in order to maximise penetration, are not so easy. Even the most experienced fluid-injections engineers need to perform some trials, at the actual site, before they are able to zero-in on the conditions that will maximise penetration. For this reason also, it is desirable that the injection apparatus be adjustable as to the major performance parameters.

The engineer is restricted by the maximum pressure that can be exerted below ground, at the particular depths. This is, in most cases, the subject of a site-specific jurisdictional regulation. Often, if the injection pressure were free of restriction, the task of injection would be much simplified.

It is a design aim of the technology described herein, to provide a pulse-injector that can be mounted at the ground-surface level, and can be used to pulse-inject liquids into the ground, and in which the pulses applied to the liquid can be varied and closely-controlled and can be adjusted by the kinds of changes and techniques that can be effected on-site without the need to resort to skilled craftsmanship or expensive facilities.

The scope of the patent protection sought is defined by the accompanying claims. Details of some specific examples will now be described, with reference to the accompanying drawings, in which:

An injection operation will now be described, in which a site has been contaminated with a chemical spill. The contaminant has percolated into the ground, where it now rests. Sometimes, a site in which the contaminant, though toxic, remains stationary is not dangerous—although it might need to be cleaned up if, for example, the property comes to be sold.

All too often, the spilled contaminant does not remain stationary, but moves through the ground, being dragged along with the groundwater. Remediation might then be required if the plume of contaminant is heading for e.g a water well, or a stream, or is escaping into a neighbouring property. In all of these cases, the injection of the chemical might need to be done over a wide area, and might need to be continued for a considerable period of time.

Sometimes, the velocity of the groundwater can be made part of the treatment system, in that the injection of remediating liquid can be placed in the path of a plume of contaminant. In that case, just a single injection-well, or a single line of injection-wells, might be sufficient. Sometimes, the contaminated site is underneath a building, and the injection has to be done through the floor of the building.

In all these circumstances, the need arises for the injection apparatus to be easily portable and easily operable, and to be adjustable so it can be tailored to the particular individual, and perhaps-changing, contamination situation.

Pulse-injection is likely to achieve better results, in terms of lateral penetration radially outwards from the injection-wall, and in terms of absence of fingering, than injection with just a steady pressure. Even better penetration can be expected when the profile of the injection pulses includes a very rapid rise-time.

However, there is a limit to how far the pulses—or rather, the effect of the rapid rise-time of the pulses—can be transmitted through a liquid, and down a pipe into the ground, and through the ground. The further the source of the pulse is located from the point at which the injected liquid leaves the injection-well, the more the explosive impact of the short rise-time pulse is attenuated, and the less effective the rapid rise-time is likely to be.

It can be expected that the pulses of the kind as generated by the apparatus as described herein, when generated by the described equipment located at ground level, will be too attenuated if the injection point is more than about fifty metres below the surface. The transmissibility of the pulses depends somewhat on the diameter of the pipe and the fifty metre depth would be for an in-ground down-pipe of e.g three cm bore diameter. For a bore diameter of, say, 1.5 cm, attenuation would be a problem below about twenty metres.

However, there are very many plumes of contaminated liquid located in groundwater at shallower depths than that—which are readily amenable to remediation using the surface-mounted apparatus as described herein.

Prior to operations, a survey will have been carried out at the contaminated site, to determine the lateral and vertical extent of the contaminated area, its velocity relative to the ground, the velocity of the groundwater itself, the nature of the contaminant and of other liquids present, the nature of the ground especially its permeability, the maximum pressure to which the ground may (legally) be subjected, at the various depths of interest, and such other measurable parameters as are deemed to be of interest.

Figure 1:
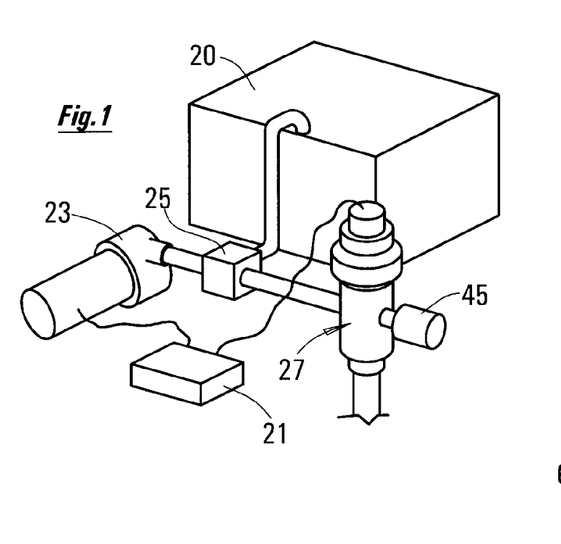
FIG. 1 is a schematic diagram showing a layout of equipment at the ground surface at the site where remediation of contaminated groundwater is being carried out.

FIG. 1 shows a typical installation of the at-ground-level equipment used for injecting a liquid chemical into an injection well. The equipment includes a reservoir 20, in which a supply of the remediation chemical to be injected is stored. In some cases, it is advisable also to provide reservoirs for different chemicals, or other liquids, such as water, etc, that might need to be injected. The designer also needs to see to such things as a power (electricity) supply 21, replenishment of the injected chemical, and so forth, and also needs to see to suitable instrumentation, which may include the taking of readings or samples from adjacent sampling wells.

If it is intended to inject the remediation liquid into a number of injection wells pitched on a grid, the at-surface equipment can be made portable, so it can be moved from one wellhead to the next.

An injection-pump 23 should be rated for the pressure at which injection is to be carried out. An operable pressure regulator 25 enables the injection pressure to be controlled and adjusted.

The remediation liquid to be injected might be, for example, a strong oxidant, and such liquids are highly corrosive. Of course, the designer of the apparatus must see to it that the equipment can cope with whatever liquid is being injected.

Figure 2:
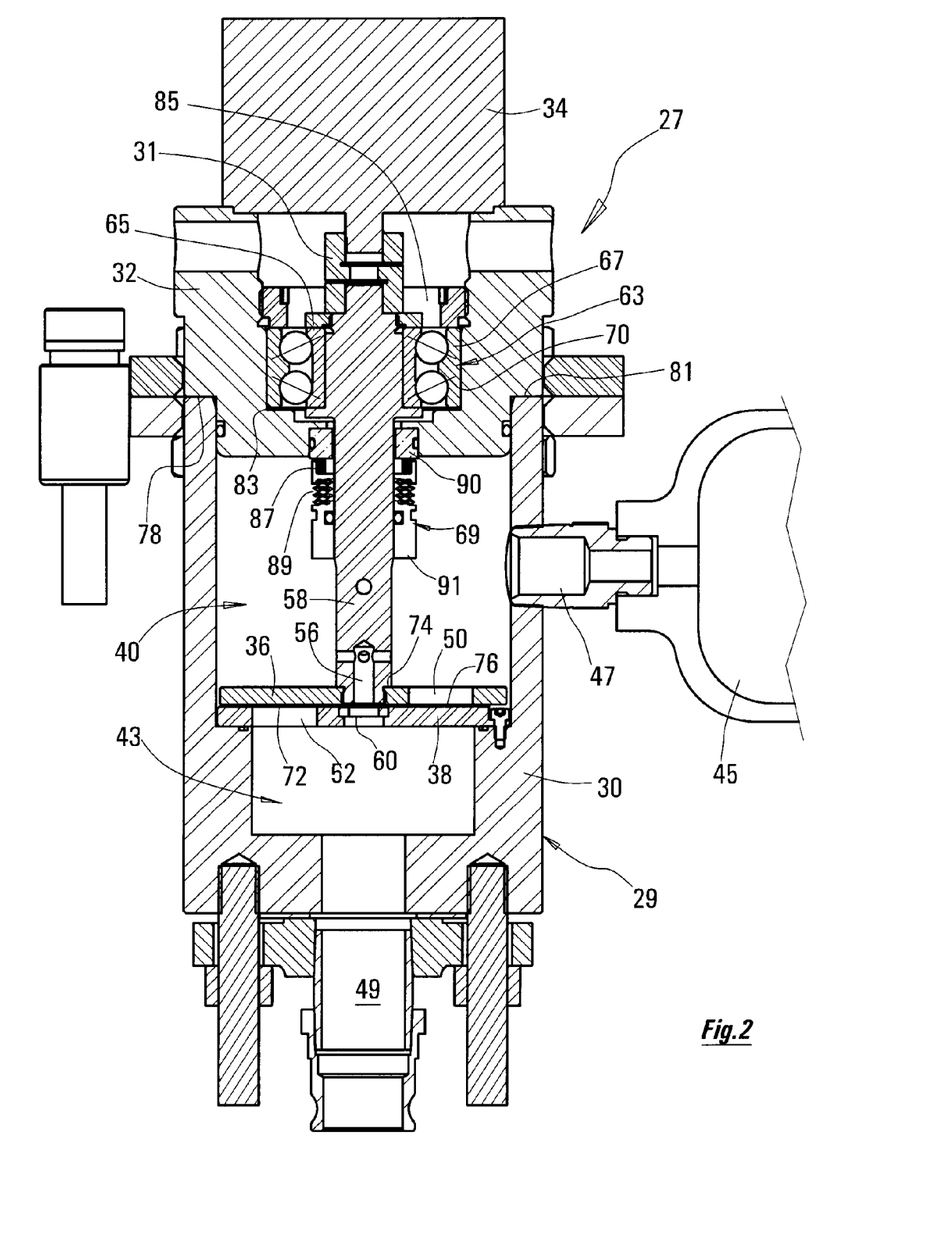
FIG. 2 is a cross-sectional side elevation of an adjustable pulse-generator.

The pressurised injection liquid is fed into the pulse-generator 27. Details of the pulse-generator 27 are shown in FIG. 2.

The adjustable pulse-generator 27 includes a housing 29. The housing includes a base 30 and a cap 32. An electric motor 34 is mounted in the cap 32, which is coupled to a drive shaft by means of a coupling 31. The shaft in turn drives a rotor-plate 36. The rotor-plate 36 lies in closely-spaced proximity to a stator-plate 38, which is fixed into the base 30 of the housing 29. An upstream-chamber 40, into which the pressurised liquid from the injection-pump 23 is fed though an inlet-port 41, is defined above the rotor-plate 36. A downstream-chamber 43 is defined in the base 30 of the housing 29, below the stator-plate 38.

A gas-pressurised accumulator 45 is provided, which communicates with the upstream-chamber 40 via an accumulator-port 47. The remediation liquid is discharged through an outlet-port 49 from the downstream-chamber 43, and into the in-ground pipe (not shown) of the injection well, and down into the contaminated aquifer.

Figure 3:
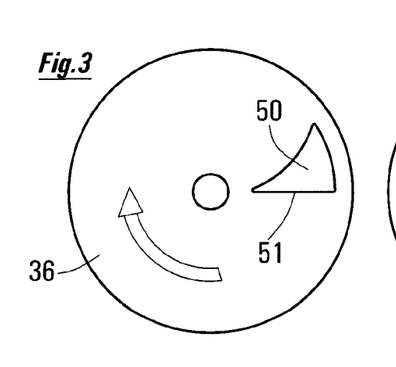
FIG. 3 is a plan view of a rotor-plate component of the pulse-generator of FIG. 2.
Figure 4:
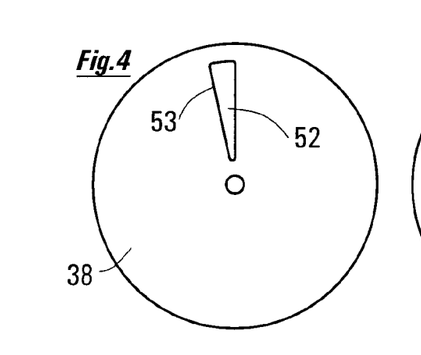
FIG. 4 is a plan view of a stator-plate component of the pulse-generator of FIG. 2.

FIG. 3 shows the rotor-plate 36, and FIG. 4 the stator-plate 38. The rotor-plate 36 is formed with at least one rotor-aperture 50, and the stator-plate 38 is formed with at least one stator-aperture 52. When the rotor-plate 36 rotates, at a point in the rotation, the rotor-aperture 50 overlies the stator-aperture 52, thereby creating a (composite) pulse-port 54, through which liquid can pass, i.e can pass from the upstream-chamber 40 to the downstream-chamber 43.

The use of the accumulator 45 provides a store of pressurised liquid in the immediate vicinity of the pulse-port. Thus, when the pulse-port opens, a high-energy, large-volume discharge of liquid takes place through the pulse-port, into the downstream-chamber 43, and down into the ground.

As mentioned, it is desirable that the profile of the pulses (i.e the shape of the pressure vs time plot) should include a very rapid rise-time. The shorter the rise-time, the more the liquid "explodes" through the pulse-port, and the further the effect of the pulse can be projected into the surrounding aquifer.

The rise-time is controlled by the shape of the rotor-aperture 50 and the stator-aperture 52. The respective leading edges 51,53 of the apertures, i.e the edges that, when the pulse-port starts to open, are the edges that first become uncovered, should be the same shape as each other, such that the pulse port opens everywhere simultaneously all along the edges. Preferably, the leading edges should simply be straight and radial. The trailing edges of the apertures are not so important, although it might sometimes be possible to engineer a beneficial effect from an explosive closure to the pulse-port, as well as from an explosive opening of the pulse-port.

Provided there is a pressure difference between the upstream-chamber and the downstream-chamber, a pulse of pressurised liquid will pass through the pulse-port for the duration of time that the rotor-aperture 50 overlies the stator-aperture 52. The pulse-port effectively creates a pulse-conduit through which liquid flows intermittently.

Figure 3A:
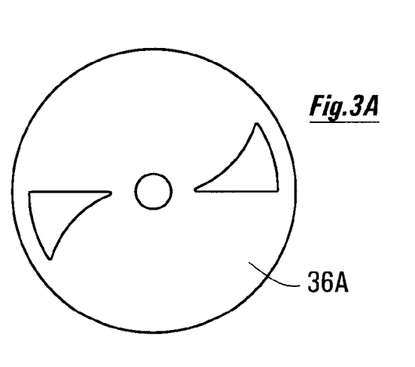
FIG. 3A is the same view of another rotor-plate.
Figure 4A:
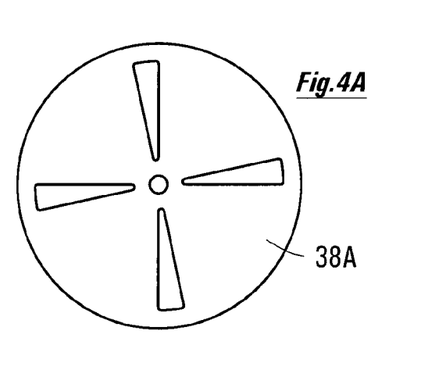
FIG. 4A is the same view of another stator-plate.

The frequency of the pulses can be adjusted simply by varying the speed of rotation of the rotor-plate 36, i.e of the electric motor 34. The frequency of the pulses can also be adjusted by changing to another rotor-plate 36A, as shown in FIG. 3A, that has a different number of rotor-apertures. Also, changing to a stator-plate 38A with a different number of stator-apertures has a corresponding effect on frequency, as shown in FIG. 4A.

Generally, it is required also that a steady flow of the remediation liquid should be maintained while the pulsing is going on. For this reason, in the pulse-generator 27, a bypass-conduit is provided, which bypasses the pulse-conduit, and which remains open whether the pulse-conduit is open or closed. In FIG. 2, the bypass-conduit 56 lies in the centre of the rotary shaft 58. Liquid passes constantly through the bypass-conduit from the upstream-chamber 40 to the downstream chamber 43. A choke 60 is provided in the bypass conduit 56, which comprises a ring or washer having a through-hole 61 of pre-determined size.

Figure 5:
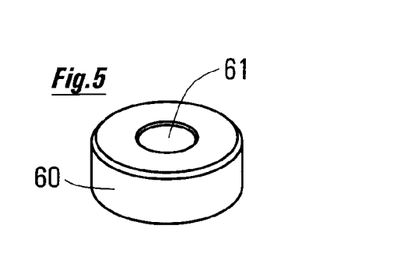
FIG. 5 is a plan view of a choke component of the pulse-generator of FIG. 2.

The choke 60 is shown separately in FIG. 5. A set of the chokes preferably should be provided, having respectively differently-sized holes. The smaller the hole in the choke 60, the greater the pressure differential that can be developed between the upstream chamber 40 and the downstream chamber 43.

The manner of mounting the rotor-plate 36 will now be described. During pulsing, the pressure in the upstream-chamber 40 is higher than the pressure in the downstream-chamber 43, and this pressure differential acts to press the rotor-plate 36 and the stator-plate 38 together, and into contact with each other.

The two plates should never be allowed to touch. But on the other hand, it is required that the two plates should be very close indeed to each other. The further apart the plates are, the more leakage there will be from the upstream-chamber 40 to the downstream-chamber 43, through the gap. Such leakage is equivalent, in its effect, to enlarging the hole 61 in the choke 60. Thus, while some slight leakage is permissible, a large leakage makes it difficult to use the choke hole 61 to set a desired pressure differential between the two chambers 40,43.

To keep leakage to a minimum, the gap between the rotor-plate 36 and the stator-plate 38, during operation (i.e during rotation), should be no more than about twenty-five or fifty microns. An upper limit, above which leakage would likely overwhelm the effectiveness of the choke, and indeed of the pulsing, would be about a hundred microns.

If the liquid being injected is at all oily, it might be possible that a film of the liquid can adhere to the surfaces of the plates, whereby a hydrodynamic bearing relationship could arise between the opposed surfaces of the two plates 36,38. A hydrodynamic bearing, if only it could be engineered, would be an excellent way of keeping the rotor- and stator-plates apart, while minimising leakage. Unfortunately, the liquid being injected, in many cases, is too thin to provide any reliable hydrodynamic effect between the two plates. Remediation liquids are often selected more for their penetrating powers than their lubricity.

The apertures are sealed closed, when they are not overlying each other, by the fact that the gap between rotor and stator is so small. Preferably, each aperture is provided with a complete unbroken encirclement of what may be termed a small-gap-area. The small-gap-area is the area of the small gap between the opposed faces of the rotor and stator. Preferably over the whole encirclement formed by the small-gap-area in the margin around the aperture, the rotor and the stator should be so configured and so mounted that the gap between them is no more than a hundred microns. It will be understood that, in the case of the opposed rotor and stator plates, as described herein, the small-gap-area extends over the whole area of the opposed faces, for convenience of manufacture.

It is important that the gap between the rotor-plate 36 and the stator-plate 38 should be very small, as indicated. And it is also no less important that the gap should be even and constant over the whole mutually-opposing area of the plates. Equally, any wobble or swash-plate effect, during rotation, must be kept to a minimum. Other forms of mismatch, such as run-out, should also be minimised down to the twenty-five micron level, or less. For these reasons, a good deal of attention must be paid to the manner of mounting the rotor-plate 36, for its rotation relative to the stator-plate 38.

In order to achieve the required degree of accuracy of mounting the rotor-plate, a double row ball-bearing unit 63 is used, in which the inner 65 and outer 67 races of the two rows are formed as respective single unitary rings.

By having both rows of balls run in the same races 65,67, the accuracy of matching the upper and lower rows of balls, and minimising all manner of angular and positional misalignments, are all handled in-factory by the bearing manufacturer. Of course the rest of the components of the apparatus of FIG. 2 have to be carefully and skillfully manufactured, but it may be expected that, by the use of such a bearing, the aggregate of mismatches and misalignments, as detected by dial gauges applied to the shaft and rotor, would be within adequate tolerance limits to ensure the accurate running of the rotor during operation. That is to say, if such a bearing unit 63 is incorporated into the design, it can be expected that adequate accuracy will be achieved as to the mounting of the rotor-plate 36 by ordinary machining processes, without having to resort to special fitting and matching techniques.

Thus, by the use of the double-row bearing 63, and by taking only a reasonable amount of care during manufacture, it is quite possible to make the apparatus reasonably secure against mis-alignment problems with respect to the rotation of the rotor-plate 36.

As mentioned, given that the seal between the rotor-plate 36 and the stator-plate 38 is good, the pressure differential between the upstream-chamber and the downstream-chamber acts to press the two plates together. In a typical case, in which the rotor-plate 36 has a diameter of e.g ten cm, and the accumulator 45 is set to a pressure of e.g twelve bars, this force might be as high as six or eight kN. Furthermore, the force might be subjected to a large force variation, between that high magnitude and e.g two or three kN, every pulse.

The bearing unit 63 has to support such thrust loading, and whatever tipping-mode loading as might arise from the pulsing activity. The kind of bearing as shown in FIG. 2, in the kind of sizes that can readily be accommodated, is easily able to take care of that thrust loading.

The bearing 63 cannot be exposed to the possibly-corrosive liquids being injected, i.e the bearing must be on the "dry" side of the rotary shaft-seal 69. In turn, this means that the rotor shaft 58 and the rotor-plate 36 inevitably constitute a significant overhang with respect to the bearing unit. Again, the type of bearing unit 63 used in the example is readily able to accommodate any adverse loadings that might arise from that overhang. The wide bearing spread may be understood from the load lines 70 in FIG. 2.

There still remains the matter of exactly positioning the rotor-plate 36 so as to achieve the typically preferred twenty-five micron spacing between the rotor-plate and the stator-plate 38. It has been found that this accurate positioning may readily be done simply by taking measurements, and shimming the bearing unit 63.

The vertical position of the underface 72 of the rotor-plate 36 can be expressed as the vertical distance from the location-shoulder 74 of the shaft 58, against which the overface 76 of the rotor-plate 38 rests during operation, to the abutment face 78 of the cap 32 of the housing 29. The vertical position of the overface 76 of the stator-plate can also be related, by simple measurement to the corresponding abutment face 81 at the top end of the base 30 of the housing 29, which will make contact with the abutment face 78 of the cap 32.

Upon assembling a particular apparatus, these distances should be carefully measured, and a calculation made as to the thickness of shims that need to be placed at 83, underneath the outer race 67 of the bearing unit 63. It should be noted that, in the case of an apparatus that has been designed as described herein, and has been manufactured reasonably carefully, but still using no more than the normal machining techniques, the gap between the rotor-plate 36 and the stator-plate 38 can be expected to have the required degree of accuracy, squareness, evenness, and lack of run-out as measured in all modes and directions, as are needed in order for the apparatus to perform as described herein.

It should also be noted that the apparatus so manufactured can also be dissembled and reassembled, with every expectation that the rotor-plate will still be accurately square to the axis of the rotor-shaft 58, and the narrow gap between the two plates will still be accurate enough, as to its width and evenness, to perform the functions as described.

It should also be noted that the plates themselves 36,38 are simple flat plates: as such, the overfaces and underfaces of the respective plates can be made parallel, to a very tight degree of tolerance, by a simple surface-grinding operation. Thus, if one rotor-plate is changed for another rotor plate, it can be expected that the replacement rotor-plate will fit into the assembly exactly as did the replaced rotor-plate—without any need then for such tool-room procedures as re-setting, re-squaring, etc. Also, the plates 36,38 can easily be designed to be made in a thick and chunky configuration (where thin, distortable, plates might incur such problems as waviness or wobble).

The shaft-seal unit 69 will now be described. The seal unit 69 has to support the pressure differential between the upstream-chamber 40 and the area 85 in which the bearing unit 63 is housed, which is at atmospheric pressure. Thus the seal 69 has to support a pressure of, typically, fifteen bars.

The seal unit 69 is engineered as a balanced face-seal. A rubbing-ring 87 of carbon, or other suitable material, is pressed resiliently, by means of a spring-device 89, against a facing-ring 90 of silicon carbide or other suitable material. If the liquid to be injected includes particles of solid material, both rubbing elements had better be of silicon carbide. The seal is balanced in the sense that pressure of the liquid sealed in the upstream-chamber 40 acts evenly on the rubbing-ring 87, so there is no (or only a small) net force between the rubbing-ring 87 and the facing-ring 90, due to the pressure.

The seal-unit 69 includes a base 91, which is secured (e.g by means of a grub-screw) to the rotary shaft 58. An O-ring seals the base 91 to the shaft 58. The resilient-zone of the spring-device 89 comprises several folds of varying thickness metal. The effect is that the folds form substantially rigid rings joined by substantially flexible links. Thus, the resilient-zone is capable of resilient movement in the axial direction (as if it were a traditional coil spring) and yet the resilient-zone 95 at the same time is liquid-tight, and is capable of supporting a considerable pressure without collapsing inwards.

As an alternative to the seal-unit 69, which includes the spring-device 89, another type of shaft seal 97 may be employed. The shaft seal 97 is shown, for convenience, in FIG. 6. The seal 97 is a conventional cup-type energised PTFE variseal. This type of seal requires that the rubbed surface of the rotary shaft be hardened and polished.

Figure 6:
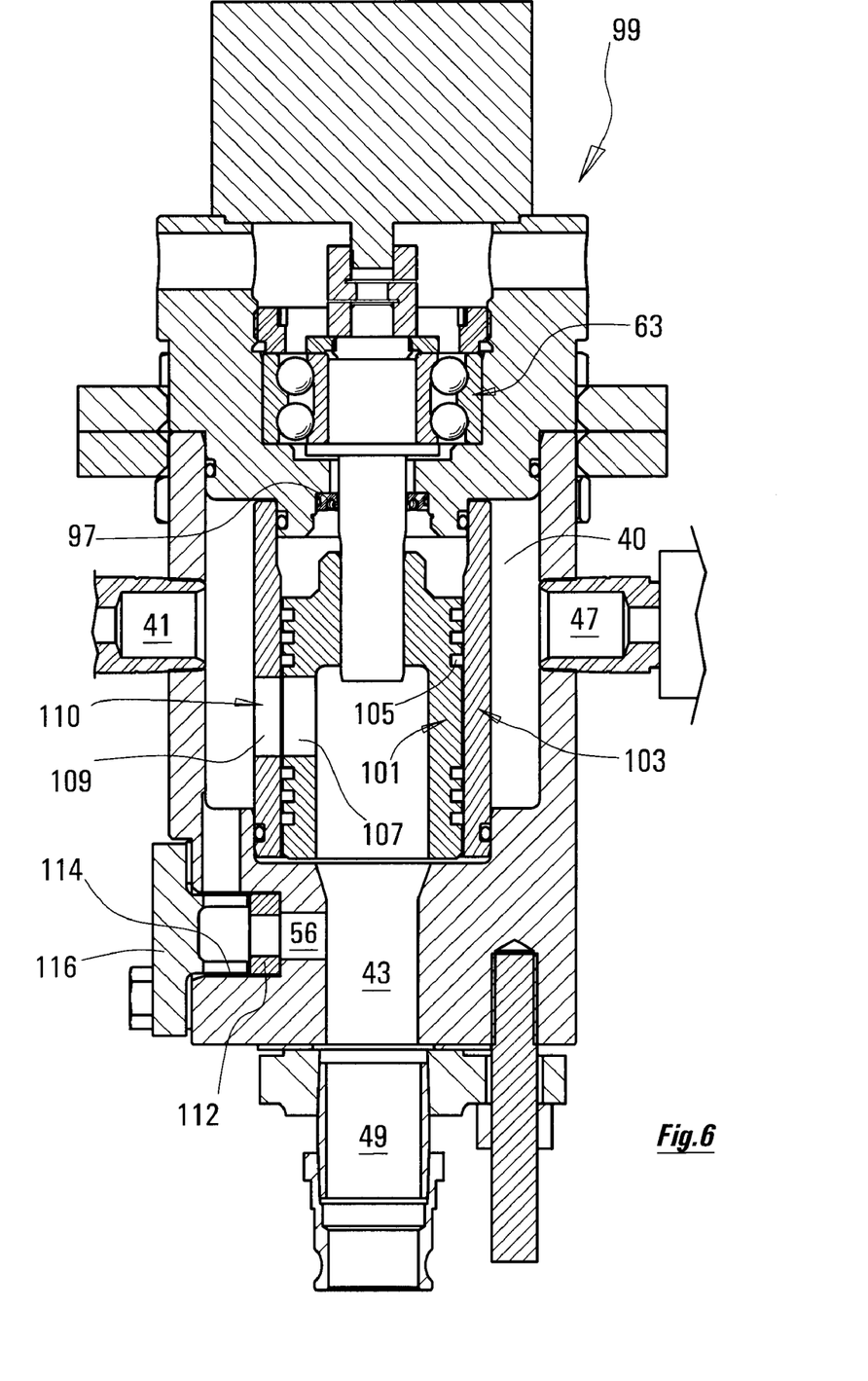
FIG. 6 is a view like FIG. 2 of another adjustable pulse-generator.

FIG. 6 shows another example 99 of an adjustable pulse-generator. Here, the rotor and stator plates of the FIG. 2 pulse-generator 27 have been replaced by a rotor-cylinder 101 and a stator-cylinder 103. Apart from this difference, the function of the pulse-generator 99 is the same as that of the pulse-generator 27. The seal between the rotor and stator again is formed by a small clearance—this time the diametral clearance between the outer surface of the rotor-cylinder 101 and the inner-bore of the stator-cylinder 103.

Again, this clearance should preferably be as small as possible—given that the two cylinders have to rotate relatively. A clearance of twenty-five or fifty microns again can be expected to enable a pressure differential to develop between the upstream and downstream chambers, to make pulsing effective. Again, however, at a (diametral) clearance of more than about a hundred microns, there would be probably be too much leakage to enable a useful pressure differential. For a more viscous injection liquid, these tight clearances might be eased somewhat.

It may be noted that, with careful manufacture, the difficulty of ensuring a small diametral clearance between two cylinders is less than the difficulty of ensuring a small clearance between two flat plates.

It has been noted that, with flat plates, the differential pressure acts in the direction to press the plates together, and the plates have to be mechanically held apart. With cylinders, because of their different geometry, the differential pressure does not act to press the opposed surfaces together. However, with the cylinders, there is still a large thrust loading on the rotating cylinder, which has to be supported by the bearing unit. Thus, with cylinders, there is almost the same need for the bearing to have a high-capacity thrust rating. (Although the same bearing is shown in FIG. 6, a more conventional bearing arrangement could be provided, for supporting the rotary shaft, because in FIG. 6 there is less need for the great freedom from misalignment problems that comes with the use of the double-row arrangement.)

In FIG. 6, the seal between the stator and rotor cylinders is created or assisted by the hydrodynamic film that (might) develop between the opposed cylindrical surfaces during rotation. Grooves 105 in the rotor-cylinder 101 can serve also as centrifugally-assisted labyrinth seals, at high rotational speeds. Corresponding grooves (not shown in FIG. 6) in the stator-cylinder 103 can serve as receptacles for small solid particles. As mentioned, some kinds of liquid being injected can contain suspended solid particles, and these might damage the seal surfaces if they were to be trapped therebetween.

With the cylinders arrangement of FIG. 6, the shaft-seal 97 can easily be placed in a location, as shown, where it is not exposed to the high pressures.

The cylinders 101,103 are provided with a rotor-aperture 107 and a stator-aperture respectively, which together constitute a pulse-port 110 and pulse-conduit. (Again, there may be more than one pulse-port per cylinder pair.)

In FIG. 6, the choke 112 is provided within an externally-accessible receptacle 114. This makes it possible for the engineer to change the choke, simply by un-bolting the cover 116, without dismantling the adjustable pulse-generator 99 as a whole.

In use, the injections-engineer determines a pulsing strategy, depending on the permeability of the aquifer, and its allowable pressure. Generally, the engineer will use the maximum pressure allowable, up to the limits of the injection pump 23 and the rest of the apparatus. If a large pressure is permissible, now a large pressure differential can be used, which means that the individual pulses can contain a good deal of energy.

It is the aim of the injections-engineer to increase the saturation level of the aquifer formation. At the commencement of injection, possibly the saturation level might be quite small, whereby the pressure needed to force more liquid into the aquifer will also be small. Sometimes, the remediation liquid can almost simply be poured into the ground. Under those conditions, there is a zero, or very small, back pressure in the downstream-chamber 43, and pulsing is hardly worthwhile. In fact, at this stage, the injections-engineer might omit the pulse-generator 27 altogether, and apply the pressurised liquid directly to the in-ground pipe.

As more liquid is injected into the ground, eventually it becomes necessary to increase the injection pressure in order to force more liquid into the ground. Now, a back pressure is present in the downstream-chamber 43. (At many sites, there is a back pressure in the downstream-chamber from the very start of injection operations) That being so, it is now possible, and advantageously useful, to apply pulses, using the pulse-generator 27, to the liquid flow being injected.

Eventually, the back pressure in the downstream-chamber might become large enough that a proportion of the liquid injected out of the pipe during the high-pressure portion of the pulse cycle actually flows back into the pipe during the low-pressure portion of the pulse cycle. Continued pulsing when (and if) this "suckback" effect happens can be very effective to homogenise the ground formation around the injection well. The suckback effect, if it happens, is capable of projecting the injected liquid, as a coherent body of liquid in the ground, large distances away from the injection well.

As mentioned, a rapid rise-time of the individual pulses can be instrumental in enabling the pulses to penetrate large distances—but this is only the case during the latter stages of injection, as the ground starts to become over-saturated, when a considerable back pressure is present in the downstream-chamber 43, even during the low-pressure parts of the pulse cycle.

At some sites, no matter how much liquid is injected over a long period, still there is very little back pressure in the downstream-chamber—and this can even happen despite indications to the contrary during the initial survey. In those cases, pulsing might not be worthwhile at all, and even if worthwhile, will have to be carried out using different pulsing parameters from those originally projected.

What this means is that the frequency and amplitude of the pulses as required to maximise results not only vary from aquifer to aquifer, but vary in respect of the individual injection well as injection proceeds and progresses. Thus, the ability of the adjustable pulse-generator 27, as described, to permit controlled variation and adjustment of the pulsing parameters is an important factor in the injections-engineers' ability to place remediation liquids in the ground. (It is sometimes possible for the remediation fluid to be a gas or a vapour; and that, too, can benefit from use of the adjustable pulse-generator as described herein.)

The adjustable pulse-generator itself preferably is backed, at a remediation site, by a kit of changeable components, being a set of rotor-plates with different numbers and shapes of apertures; also a corresponding set of stator-plates; and also a set of chokes of different hole-sizes. The other variable parameters arise from the ability to control and vary the pressure setting of the pump regulator 25, and the pressure setting of the accumulator 45, and to vary the speed of the electric motor 34.

The amount of liquid stored in the accumulator may be regarded as including the volume not only within the accumulator structure itself, but also the volume within the upstream-chamber, and indeed the volume of any portion of the liquid being injected that is at the same pressure as the upstream-chamber, and is connected with the upstream chamber via a conduit that is at least as large in area as the pulse-port when fully open.

The accumulator also contains a resilience. In the example, the resilience is a pressurised gas. Preferably, the degree of resilience provided should be enough that, when the pulse-port has been open, and is on the point of closing, the pressure at that moment, within the upstream-chamber, should not fallen to below half what it was just before the pulse-port opened.

Thus, the engineer might want to experiment with high-volume low-frequency pulses at high-pressures, or low-volume high-frequency pulses at low-pressures. The various adjustabilities of the adjustable pulse-generator permit such experiments, very readily and without required (much) skill on the part of the operator.

Some of the performance features of the adjustable pulse-generators as depicted herein may be summarised as follows:

Increased penetration of injected remediation liquid out from the injection-well, thereby maximising total volume injected at a site.

Increased overall injection flowrates, thereby minimising time spent at the site.

Increased intimacy of mixing of the injected remediation fluid with the targeted contaminant, thereby increasing treatment efficiency, and reducing chemical costs.

Reduced fingering and improved evenness of penetration and distribution of remediation liquid in an aquifer.

Reducing wastage of unstable remediation fluid, by rapid deployment of fluid into the aquifer.

Permits simple but accurate depth placement of remediation liquids, enabling specific depth zones to be targeted.

Has large range of operational flexibility and adjustablity, so can be used effectively at different kinds of sites.

Also, the one piece of equipment is adjustable for use throughout all stages of injection at a site, from initial flooding to final long-distance penetration.

Some further operational details include:

High injection rates, adjustable typically up to hundred-fifty litres per minute.

Injection pressures adjustable up to twenty bar.

Injection at depths down to fifty metres.

Injection into aquifers and formations with permeabilities ranging from 1 e-2 cm/sec to 1 e-7 cm/sec (approximately one milliDarcy to one Darcy).

Compatible with all types of direct-push equipment and all types of injection-well, and with all injection methods (e.g top-down, bottom-up).

Some further advantages are:

The adjustable pulse-generator and the associated equipment can readily be designed to be small, robust, and of relatively low cost both to provide and to operate.

The apparatus can readily be rendered compatible with a wide range of injection chemicals and pH environments, by the use of stainless steel and viton seals.

The apparatus can readily be designed to be simple to install and operate, by one person, after minimal training.

Traditionally, the injections-engineer would simply set the pump to the maximum permissible pressure that can be applied to the aquifer or formation, and would inject at the maximum flowrate available. However, with that traditional manner of injection, the flowrate that could be injected using that available pressure soon dwindled, and the already-injected liquid would be found to have penetrated the surrounding ground only in fingers, as described.

With pulsing, however, much more (sometimes very much more) remediation liquid can be injected into the ground, overall, while the pressure of injection remains below the allowed maximum. Thus, although the initial flowrate might be higher with traditional non-pulsing injection, the drop-off in flowrate over time, at the given max pressure, is much less with pulsed injection.

The injections-engineer, in carrying out the enabled adjustments, may note the following.

Pulse frequency may be adjusted by adjusting the speed of rotation, and pulse frequency may be adjusted also by changing the number of ports uncovered per revolution. Thus, by combining these two modes, changes of frequency can be made largely independently of changes to e.g the pressure differential or the supply pressure.

Pulse amplitude may be defined as the integral of the product of pressure, as it changes over the duration of the pulse, and the volume that has passed through the pulse-conduit over the duration of the pulse. Again, by suitable interplay of the adjustable parameters, this amplitude can be made largely independently of changes to e.g pulse frequency.

To give the fastest possible rise-time, the speed of the rotor, and the pressure differential between the upstream-chamber and the downstream-chamber, should be maximised. At different stages of the injection, the maximum levels of these two parameters—or rather, the levels at which their combined effects can be maximised—changes. With the use of the adjustable pulse-generator, as described herein, the engineer is able easily to juggle the different parameters, and to adapt them to the changing conditions.

It should be understood that components and features provided in respect of one embodiment described herein can be interchanged with corresponding features in other embodiments, insofar as that is physically possible, unless otherwise stated.

The numerals used in the drawings are listed below.
20 reservoir of liquid to be injected
21 electricity supply
23 injection pump
25 pressure regulator
27 pulse-generator
39 housing
30 housing base
32 housing cap
34 electric motor
36 rotor-plate
36A another rotor-plate
38 stator-plate
38A another stator-plate
40 upstream-chamber
41 inlet-port
43 downstream-chamber
45 gas-pressurised accumulator
47 accumulator port
49 outlet-port
50 rotor-aperture
51 leading edge of rotor-aperture
52 stator-aperture
53 leading edge of stator-aperture
56 bypass-conduit
58 rotary shaft
60 choke
61 through-hole in choke
63 double-row ball-bearing unit
65 inner race
67 outer race
69 shaft-seal unit
70 bearing load lines
72 underface of rotor-plate 36
74 locating-shoulder on shaft 58
76 overface of stator-plate 38
78 abutment-face of cap 32
81 abutment-face at top end of base 30
83 shim
85 "dry" area outside seal 69
87 rubbing-ring of shaft-seal unit
89 spring-device
90 facing-ring of shaft-seal unit
91 base of spring-device 89
95 resilient zone of spring-device 89
97 cup-type shaft-seal (FIG. 6)
99 pulse-generator
101 rotor-cylinder
103 stator-cylinder
105 grooves in rotor-cylinder
107 rotor-aperture
109 stator-aperture
110 pulse-port
112 choke
114 choke receptacle
116 receptacle cover.

The invention claimed is:

1. An operable fluid-injector, which is operable in combination with a body of ground and an injection-well located in the body of ground, wherein:

the injection-well is so arranged as to conduct a flow of fluid down an in-ground pipe of the injection-well, and to inject the fluid therefrom out into the ground formation around the injection-well;

the fluid-injector is located at the ground surface;

the fluid-injector is effective, when operated, to increase the concentration of the injected fluid in groundwater in the formation around the injection-well;

the fluid-injector includes a pulse-generator, for superimposing pulses onto the flow of fluid down the in-ground pipe;

the pulse-generator is mounted at ground surface level;

the pulse-generator includes a housing, in which is mounted an electric motor, having a rotating drive-shaft;

the pulse-generator includes a rotor, which is drive-coupled to the drive-shaft, and a stator;

the housing defines an upstream-chamber, which has an inlet-port for receiving fluid from a supply reservoir;

the housing defines a downstream-chamber, which has an outlet-port for conveying fluid to the in-ground pipe;

the housing includes a pulse-conduit, containing an openable and closable pulse-port;

the pulse-conduit is structured for conveying fluid, when open, from the upstream-chamber to the downstream-chamber;

the rotor is provided with a rotor-aperture, and the stator is provided with a stator-aperture;

the rotor-aperture and the stator-aperture are so arranged that, as the rotor rotates, the rotor-aperture cyclically covers and uncovers the stator-aperture;

the pulse-port of the pulse-conduit is fully open when the rotor-aperture fully overlies the stator-aperture, is partially open when a portion of the rotor-aperture overlies a portion of the stator-aperture, and is closed when no portion of the rotor-aperture overlies any portion of the stator-aperture;

whereby, insofar as the upstream-chamber at a higher pressure than the downstream-chamber, and insofar as the motor rotates, a pulse comprising a pressurised pulse-volume of liquid passes from the upstream-chamber to the downstream-chamber, through the pulse-conduit, when the pulse-port is open.

2. The fluid-injector of claim 1, wherein:

the housing includes a bypass-conduit, which is structured for conveying fluid from the upstream-chamber to the downstream-chamber, separately from the pulse-conduit;

the pulse-generator is so arranged that:

(a) when the pulse-port is closed, the upstream-chamber is in fluid-conveying communication with the downstream-chamber only via the bypass-conduit; and (b) when the pulse-port is open, the upstream-chamber is in fluid-conveying communication with the downstream-chamber via the bypass-conduit and additionally via the pulse-conduit.

3. The fluid-injector of claim 1, wherein:

the apertures that form the pulse-port are surrounded, when the pulse-port is fully closed, by respective marginal areas;

the marginal areas thereof include respective small-gap-areas;

each small-gap-area constitutes a complete unbroken encirclement of its respective aperture;

over the whole small-gap-area, respective surfaces of the rotor and the stator lie in face-to-face opposition, with a gap therebetween; and at no point around the complete unbroken annular encirclement of the aperture is the gap larger than a hundred microns.

4. The fluid-injector of claim 1, wherein:

the housing includes a bypass-conduit, which is structured for conveying fluid from the upstream-chamber to the downstream-chamber, separately from the pulse-conduit;

the pulse-generator includes a first choke and a second choke;

the first choke is assemblable into a choke-receptacle, having a through-hole of an area CA1 sq.cm, which defines the smallest fluid-conveying cross-sectional area of the bypass-conduit between the upstream-chamber and the downstream-chamber;

the choke and choke receptacle are so structured that the receptacle can be opened and the first choke removed, and replaced by the second choke; and the second choke has a through-hole area of CA2 sq.cm, CA2 being not equal to CA1.

5. The fluid-injector of claim 1, wherein the pulse-generator includes structure that is so configured as to enable adjustment of the frequency at which pulses pass through the outlet-port.

6. The fluid-infector of claim 5, wherein:

the pulse-generator includes an operable motor speed control, which is effective, when operated, to adjust the speed of rotation of the electric motor;

the pulse-frequency adjuster additionally includes a kit comprising either:

(a) the said rotor, with its rotor-aperture, and a second-rotor, having two or more rotor-apertures, the second-rotor being interchangeable with the said rotor in the pulse-generator; or (b) the said stator, with its stator-aperture, and a second-stator, having two or more stator-apertures, the second-stator being interchangeable with the said stator in the pulse-generator; or (c) both.

7. The fluid-infector of claim 1, including an operable pulse-amplitude-adjuster, which is effective, when operated, to change the amplitude of the pulses.

8. The fluid-infector of claim 1, including an operable pulse-rise-time-adjuster, which is effective, when operated, to change the rise-time of the pulses.

9. The fluid-infector of claim 1, including an operable differential-pressure adjuster, which is effective, when operated, to change the difference between the pressure in the upstream-chamber and the pressure in the downstream-chamber that obtains when the pulse-port is fully closed.

10. The fluid-infector of claim 1, wherein:

the pulse-generator includes an accumulator, having a liquid-storage-volume, which includes the volume of liquid that is in the upstream-chamber and that communicates with the upstream chamber through an accumulator port;

the liquid-conveying cross-sectional area of the accumulator-port is at least as large as the liquid-conveying cross-sectional area of the pulse-port when fully-open;

the accumulator includes a resilience the resilience has such physical characteristics as to have the capability, during rotation of the rotor, of maintaining liquid in the upstream-chamber at a pressure of at least half the level of pressure that obtains in the upstream-chamber when the pulse-port is partially open but is on the point of closing, as when the pulse-port was fully-closed.

11. The fluid-injector of claim 1, wherein:

the rotor includes a rotor-flat-surface, into which the rotor-aperture is formed;

the stator includes a stator-flat-surface, into which the stator-aperture is formed;

the pulse-generator is so arranged that the stator-flat-surface and the rotor-flat-surface lie in face-to-face opposition, being separated by a gap of not more than a hundred microns.

12. The fluid-injector of claim 11, wherein:

the rotor-plate is rigidly fixed to the drive-shaft, and the drive shaft is guided for rotation by means of a rolling bearing assembly;

the bearing assembly includes two rows of balls, which run in respective inner and outer race-ways;

the two outer race-ways are formed in a single unitary outer race; and the two inner race-ways are formed in a single unitary inner race.

13. The fluid-injector of claim 12, wherein:

the housing includes a cap and a base, which are held together, during operation, in that respective abutment surfaces of the cap and base are held together by an operable fastening means;

the cap is separable from the base for the purposes of disassembling the pulse-generator, by operating the fastening means, and then separating the abutment surfaces;

the bearing assembly is fixed into the cap;

the manner of mounting of the bearing assembly into the cap, of the drive-shaft into the bearing, and of the rotor-plate to the drive-shaft, is such that, when the cap is removed from the base, the bearing assembly, the drive-shaft, and the rotor-plate remain with the cap;

whereby the drive-shaft and the rotor-plate remain equally firmly secured relative to the cap when the cap is removed from the base as they were secured when the cap was fastened to the base.

14. The fluid-infector of claim 13, wherein:

the drive-shaft includes a flat shoulder, lying at right-angles to the axis of the shaft, against which a flat surface of the rotor-plate can be held by means of an operable rotor-fastener;

the pulse-generator includes a second-rotor-plate, having an equivalent second-flat-surface, and having a different configuration of rotor-aperture from the said rotor-plate;

whereby, when the rotor-fastener is operated, the said rotor-plate can be removed from the shaft, and substituted by the second-rotor-plate.

15. The fluid-infector of claim 1, wherein:

the rotor includes a rotor-cylinder, into which the rotor-aperture is formed;

the stator includes a stator-cylinder, into which the stator-aperture is formed;

the cylinders are configured for relative rotation, one inside the other.

16. The fluid-infector of claim 1, wherein:

the pulse-generator includes structure that is so configured as to enable adjustment of the frequency at which pulses pass through the outlet-port, and includes also:

(a) an operable pulse-amplitude-adjuster, which is effective, when operated, to change the amplitude of the pulses;

(b) an operable pulse-rise-time-adjuster, which is effective, when operated, to change the rise-time of the pulses; and (c) an operable differential-pressure adjuster, which is effective, when operated, to change the difference between the pressure in the upstream-chamber and the pressure in the downstream-chamber that obtains when the pulse-port is fully closed.

17. The fluid-infector of claim 1, wherein:

groundwater in the body of ground is contaminated with a toxic liquid;

the toxic liquid is amenable to alleviation of its toxicity as by being mixed with a remediation liquid; and the injected fluid is the remediation liquid.

18. Procedure for using the fluid-infector of claim 16 to inject a fluid into the ground, including:

providing a reservoir of the fluid to be injected;

providing an injection pump, and operating the same to inject the fluid from the reservoir, through the pulse-generator, via the injection-well, down into the ground;

monitoring pressure in the downstream-chamber, and at least after a substantial pressure obtains in the downstream-chamber, operating the electric motor, thereby creating pulses in the fluid being injected;

monitoring pressure in the upstream-chamber and monitoring flowrate of fluid passing into the ground; and adjusting pulse frequency, pulse-amplitude, pulse-rise-time, and differential-pressure, in such manner as to maximise the amount of fluid delivered into the ground over a period of time.

* * * * *